Patented July 24, 1951

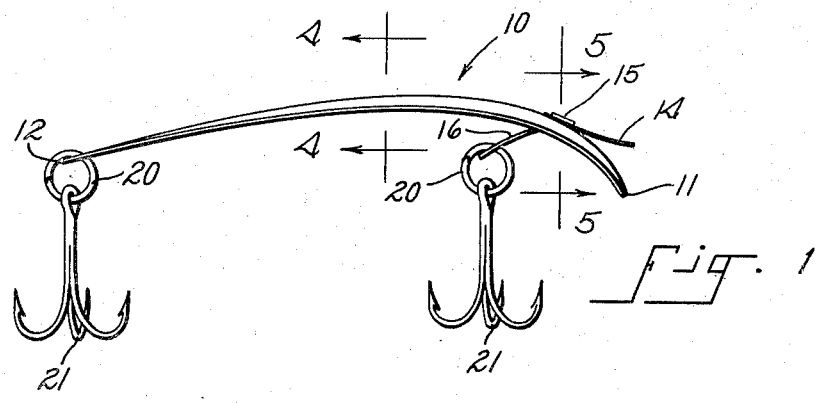
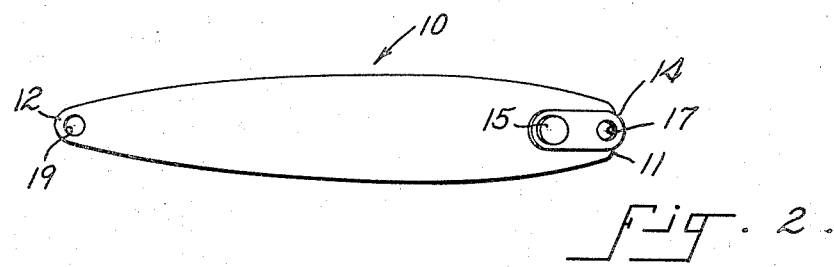
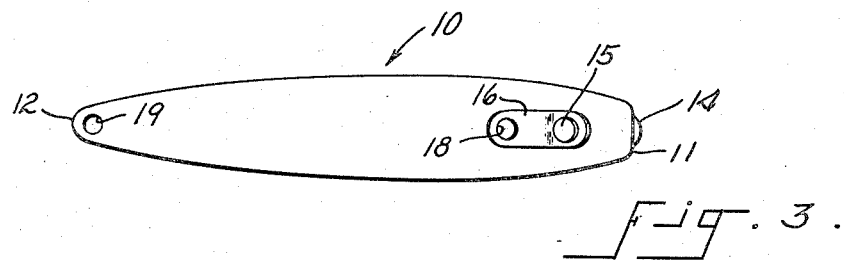
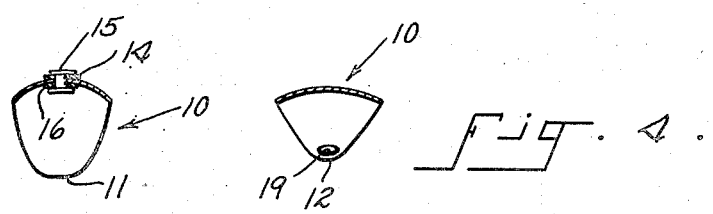

2,561,647

UNITED STATES PATENT OFFICE 2,561,647

FISHING LURE

Elmer J. Bohart, Yakima, Wash.

Application August 2, 1949, Serial No. 108,123

5 Claims. (Cl. 43—42.5)

The present invention comprises a fishing lure designed to simulate the action of a dying or crippled fish when drawn through the water at the end of a line. The general idea of such a lure is old, but the present invention comprises a lure which is not only of extreme simplicity to manufacture but which has a more realistic action than any lure heretofore devised. The lure comprises a sheet metal body having small and inexpensive, easily assembled plates thereon which increase the tendency of the lure to simulate the appearance of a crippled or dying fish.

The action of the present invention is different from that of any lure of a similar character in that the lure not only wiggles from side to side while traveling through the water, but it dives deeply from time to time while turning on its side, then rises in the water while wiggling from side to side and, upon reaching an upper level, will again dive while turning on its side in the same or the opposite direction.

The objects and advantages of the present invention will be more readily ascertained from inspection of the following specification taken in connection with the accompanying drawings wherein like numerals refer to like parts throughout, while the features of novelty will be more distinctly pointed out in the appended claims.

In the drawings, Fig. 1 is a side elevation of the lure of the present invention;

Fig. 2 is a plan view thereof with the hook means removed therefrom;

Fig. 3 is a bottom view of the lure with the hook means removed therefrom;

Fig. 4 is a vertical section taken along line 4—4 of Fig. 1, with the hook means removed; and Fig. 5 is a vertical section taken along line 5—5 of Fig. 1.

The lure of the present invention comprises an elongated, relatively narrow, body 10 of sheet metal which is generally elliptical in outline with its forward portion from the nose 11 to a median point being generally slightly broader than its rearward portion from the rear extremity 12 to the median point. The lure body is curved upwardly in the longitudinal direction with the forward half thereof being of greater curvature than its rearward half, the forward half progressively increasing in curvature toward the nose 11 and the rear half progressively decreasing in curvature toward the rear extremity 12. The lure body is also curved upwardly in the transverse direction at least throughout the forward half thereof, with the degree of curvature increasing progressively from the extremities toward a point about one-third of the way back from the nose 11. A first narrow plate 14 is secured to the upper surface of the body along the longitudinal axis thereof at a point to the rear of the nose 11 within the forward quarter of its length, the plate extending longitudinally forward at an acute angle to the forward portion of the body and terminating above the nose 11. The plate 14 is preferably secured to the body by a rivet 15 which passes through an opening in the rear end of the plate 14, through an opening in the body 10, and through an opening in the forward end of a second narrow plate 16 secured to the underside of the body by the rivet 15. The plate 16 extends longitudinally rearwardly at an acute angle to the adjacent portion of the body somewhat greater than the angle between plate 14 and the forward portion of the body. The plate 16 preferably terminates within an imaginary chord drawn between the extremities of the body. The plate 14 is provided with an opening 17 in its forward end for the purpose of attaching a line to the lure, and the plate 16 is provided with an opening in its rearward extremity for the purpose of attaching first hook means to the lure. An opening 19 is provided in the rear extremity of the body for the purpose of attaching second hook means to the lure. As illustrated, each hook means preferably comprises a split ring 20 of relatively large diameter with respect to the eye of a normal hook, and a treble hook 21 retained by the split ring. It is to be appreciated that other forms of hooks may be utilized with the lure, and the hooks may be otherwise pivotally mounted at the extremities of the body and of the lower plate 16. Likewise, particularly in smaller sizes of lures, one or the other of the hook means may be eliminated.

When being drawn through water at the end of a line, or when being held stationary in rapidly moving water by a line, the lure dives from a relatively high point while turning on its side. Upon reaching a relatively low point the lure climbs upwardly toward a higher point, and upon reaching a higher point again dives while turning on its side toward the same or the opposite side. The diving and climbing actions are erratic and haphazard, and are accompanied by wiggling of the body from side to side, the wiggling action resulting from the shape of the body 10 being enhanced by the plates 14 and 16, both of which provide surfaces resisting movement when the lure moves relative to the water. The lure never completes a circling movement so that the line is not twisted by the lure turning around while being drawn through the water. The lure has been tried under many circumstances and because of its natural action seems to incite fish of many types and sizes to attack the lure while other lures being used in the same manner at the same times and places are not approached by the fish. The lure may be made of any bright metal, or may be plated on one side to contrast with the other, or may be enameled in various colors.

Having illustrated and described a preferred embodiment of the invention, it should be apparent to those skilled in the art that the invention permits of modification in arrangement and detail. I claim as my invention all such modifications as come within the true spirit and scope of the appended claims.

I claim:

1. A fishing lure designed to simulate the action of a dying or crippled fish when relatively moved through water at the end of a line comprising an elongated, relatively narrow body of sheet metal, said body having a generally elliptical outline, said body being curved upwardly in the longitudinal direction from end to end with the forward half being of greater curvature than its rearward half and with the degree of curvature of the forward half progressively increasing toward the forward extremity, said body being curved upwardly in the transverse direction from end to end with the greatest degree of curvature being near the longitudinal center thereof, a first narrow, elongated plate rigidly secured to the upper surface of said body along the longitudinal axis thereof at a point spaced rearwardly from the forward extremity of the body and within the forward quarter of its length, said plate projecting longitudinally forward at an acute angle to the forward portion of said body and terminating above the forward extremity thereof, said first plate comprising means for attaching a line to said lure with the point of attachment being at the forward end of said first plate, and a second narrow plate rigidly secured to the lower surface of said body beneath the point of attachment of said first plate to said body, said second plate projecting longitudinally rearward at an acute angle with respect to the adjacent portion of said body, both of said plates providing surfaces resisting movement when the lure moves relative to the water.

2. A fishing lure designed to simulate the action of a dying or crippled fish when relatively moved through water at the end of a line comprising an elongated, relatively narrow body of sheet metal, said body having a generally elliptical outline with its forward portion generally wider than its rearward portion, said body being curved upwardly in the longitudinal direction from end to end with the degree of curvature progressively increasing toward the forward extremity, said body being curved upwardly in the transverse direction from end to end with the greatest degree of curvature being near the longitudinal center thereof, a first narrow, elongated plate rigidly secured to the upper surface of said body along the longitudinal axis thereof at a point spaced rearwardly from the forward extremity of the body and within the forward quarter of its length, said plate projecting longitudinally forward at an acute angle to the forward portion of said body and terminating above the forward extremity thereof, said first plate comprising means for attaching a line to said lure with the point of attachment being at the forward end of said first plate, and a second narrow plate rigidly secured to the lower surface of said body beneath the point of attachment of said first plate to said body, said second plate projecting longitudinally rearward at an acute angle with respect to the adjacent portion of said body, the angularity of said second plate with respect to said body being greater than the angularity of said first plate with respect to said body, both of said plates providing surfaces resisting movement when the lure moves relative to the water.

3. A fishing lure designed to simulate the action of a dying or crippled fish when relatively moved through water at the end of a line comprising an elongated, relatively narrow body of sheet metal, said body having a generally elliptical outline with its forward portion generally wider than its rearward portion, said body being curved upwardly in the longitudinal direction from end to end with the forward half being of greater curvature than its rearward half and with the degree of curvature of the forward portion progressively increasing toward the forward extremity, said body being curved upwardly in the transverse direction from end to end with the degree of curvature progressively increasing from the extremities toward the middle, a first narrow, elongated plate rigidly secured to the upper surface of said body along the longitudinal axis thereof at a point spaced rearwardly from and relatively near the forward extremity of the body, said plate projecting longitudinally forward at an acute angle to the forward portion of said body and terminating above the forward extremity thereof, said first plate comprising means for attaching a line to said lure with the point of attachment being at the forward end of said first plate, a second narrow plate rigidly secured to the under surface of said body beneath the rear end of said first plate, said second plate projecting longitudinally rearward at an acute angle with respect to the adjacent portion of said body, and hook means pivotally mounted on said body adjacent the rear extremity thereof, both of said plates providing surfaces resisting movement when the lure moves relative to the water.

4. A fishing lure designed to simulate the action of a dying or crippled fish when relatively moved through water at the end of a line comprising an elongated, relatively narrow body of sheet metal, said body having a generally elliptical outline with its forward portion generally wider than its rearward portion, said body being curved upwardly from end to end in the longitudinal direction with the forward half being of greater curvature than its rearward half, said body being curved upwardly in the transverse direction from end to end with the degree of curvature progressively increasing from the extremities toward a point slightly forward of the longitudinal center thereof, a first narrow, elongated plate rigidly secured to the upper surface of said body along the longitudinal axis thereof at a point spaced rearwardly from the forward extremity of the body and within the forward quarter of its length, said plate projecting longitudinally forward at an acute angle to the forward portion of said body and terminating above the forward extremity thereof, said first plate comprising means for attaching a line to said lure with the point of attachment being near the forward end of said first plate, a second narrow plate rigidly secured to the under surface of said body near the point of attachment of said first plate to said body, said second plate projecting longitudinally rearward at an acute angle with respect to the adjacent portion of said body, and hook means pivotally mounted on said body adjacent the rear extremity thereof, both of said plates providing surfaces resisting movement when the lure moves relative to the water.

5. A fishing lure designed to simulate the action of a dying or crippled fish when relatively moved through water at the end of a line comprising an elongated, relatively narrow body of sheet metal, said body having a generally elliptical outline, said body curved upwardly in the longitudinal direction from end to end with the degree of curvature generally increasing toward the longitudinal center thereof, said body being curved upwardly in the transverse direction from end to end with the degree of curvature generally increasing toward the longitudinal center thereof, a first narrow, elongated plate rigidly secured to the upper surface of said body along the longitudinal axis thereof at a point spaced rearwardly from and relatively near the forward extremity of the body, said plate projecting longitudinally forward at an acute angle to the forward portion of said body and terminating above the forward extremity thereof, said first plate comprising means for attaching a line to said lure with the point of attachment being near the forward end of said first plate, a second narrow plate rigidly secured to the under surface of said body near the point of attachment of said first plate to said body, said second plate projecting longitudinally rearward at an acute angle with respect to the adjacent portion of said body, the angularity of said second plate with respect to said body being greater than the angularity of said first plate with respect to said body, first hook means pivotally mounted on said second plate near the rear extremity thereof, and second hook means pivotally mounted on said body near the rear extremity thereof, both of said plates providing surfaces resisting movement when the lure moves relative to the water.

ELMER J. BOHART.

REFERENCES CITED

The following references are of record in the file of this patent:

UNITED STATES PATENTS

| Number | Name | Date |
|---|---|---|
| 1,487,556 | Goble | Mar. 18, 1924 |
| 1,963,380 | Peters et al. | June 19, 1924 |
| 2,280,197 | Ounsworth | Apr. 21, 1942 |
| 2,485,448 | Kennedy | Oct. 18, 1949 |

Certificate of Correction

Patent No. 2,561,647                                      July 24, 1951

ELMER J. BOHART

It is hereby certified that error appears in the printed specification of the above numbered patent requiring correction as follows:

Column 5, line 13, for "body curved" read *body being curved*;

and that the said Letters Patent should be read as corrected above, so that the same may conform to the record of the case in the Patent Office.

Signed and sealed this 18th day of September, A. D. 1951.

[SEAL]

THOMAS F. MURPHY,
*Assistant Commissioner of Patents.*